(12) United States Patent
Pirritano et al.

(10) Patent No.: US 6,620,057 B1
(45) Date of Patent: Sep. 16, 2003

(54) SYSTEM FOR LOCATING GOLF BALLS

(75) Inventors: Anthony J. Pirritano, Murrietta, CA (US); Raymond Imblum, Corona, CA (US); Thomas R. Pierce, Huntington Beach, CA (US)

(73) Assignee: Flite Traxx, Inc., Corona, CA (US)

( * ) Notice: Subject to any disclaimer, the term of this patent is extended or adjusted under 35 U.S.C. 154(b) by 0 days.

(21) Appl. No.: 09/293,522

(22) Filed: Apr. 15, 1999

(51) Int. Cl.$^7$ ............................ A63B 43/06; G01S 13/08
(52) U.S. Cl. ........................................... 473/353; 342/51
(58) Field of Search ................ 473/353; 342/51; 340/825.54

(56) References Cited

U.S. PATENT DOCUMENTS

| | | | |
|---|---|---|---|
| 3,782,730 A | | 1/1974 | Horchler |
| 4,656,463 A | * | 4/1987 | Anders et al. ......... 340/825.54 |
| 4,660,039 A | | 4/1987 | Barricks et al. |
| 4,675,816 A | * | 6/1987 | Brandon et al. ............. 700/91 |
| 4,737,789 A | * | 4/1988 | Nysen ........................... 342/51 |
| 4,850,031 A | * | 7/1989 | Allsop et al. ................ 455/49 |
| 4,890,111 A | * | 12/1989 | Nicolet et al. ............... 342/51 |
| 4,991,851 A | | 2/1991 | Melesio |
| 5,112,055 A | | 5/1992 | Barnhill |
| 5,132,622 A | | 7/1992 | Valentino |
| 5,423,549 A | | 6/1995 | Englmeier |
| 5,447,314 A | | 9/1995 | Yamazaki et al. |
| 5,525,967 A | * | 6/1996 | Azizi et al. ................. 340/573 |
| 5,626,531 A | * | 5/1997 | Little ............................ 473/353 |
| 5,630,216 A | * | 5/1997 | McEwan ..................... 455/215 |
| 5,662,533 A | | 9/1997 | Chadwell |
| 5,662,534 A | | 9/1997 | Kroll et al. |
| 5,691,922 A | * | 11/1997 | McEwan et al. .............. 700/91 |
| 5,743,815 A | | 4/1998 | Helderman |
| 5,936,527 A | * | 8/1999 | Isaacman et al. ...... 340/825.54 |
| 6,113,504 A | * | 9/2000 | Kuesters ..................... 473/353 |

\* cited by examiner

*Primary Examiner*—Jessica Harrison
(74) *Attorney, Agent, or Firm*—Fulwider Patton Lee & Utecht, LLP

(57) ABSTRACT

The present invention provides a system for locating lost golf balls which includes a golf ball that incorporates an array of passive transponders and a radio frequency ("RF") transmitter/receiver capable of energizing the passive transponder array and of detecting a signal emitted by the array. Each passive transponder functions as a tuned LC circuit that is charged by the RF transponder/receiver and emits an RF signal, detectable by the RF transmitter/receiver, for a finite period of time after the RF transmitter/receiver is turned off.

11 Claims, 6 Drawing Sheets

FIG. 1
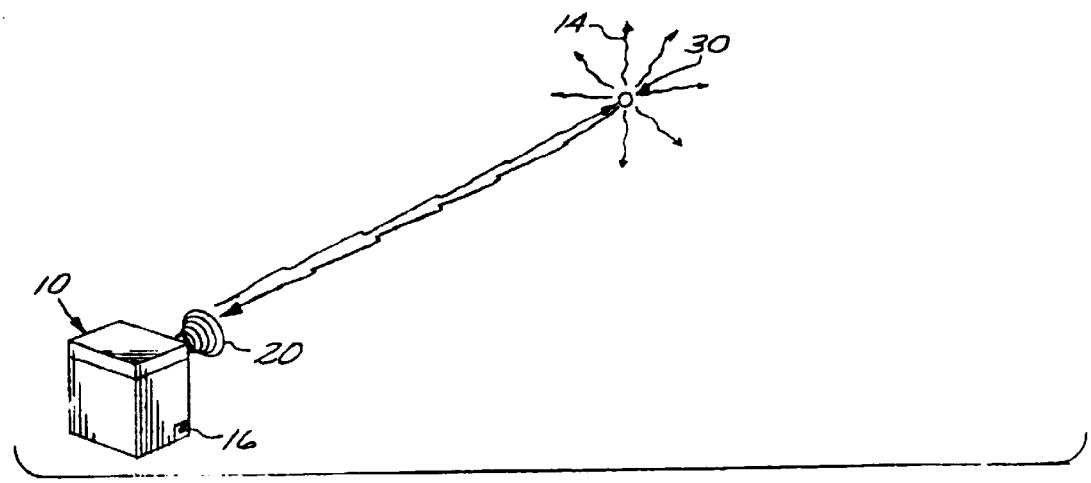
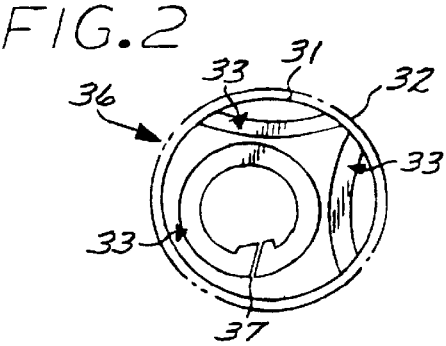
FIG. 2
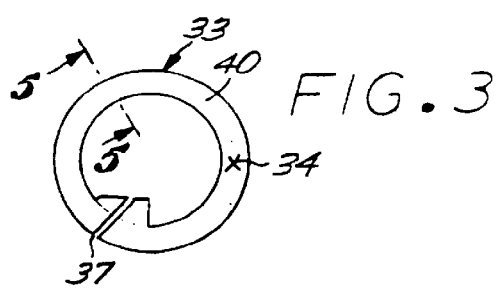
FIG. 3
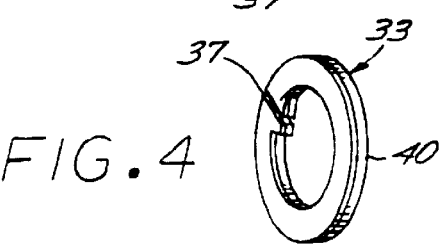
FIG. 4
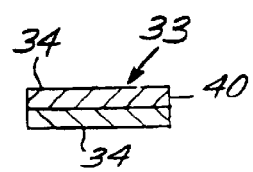
FIG. 5

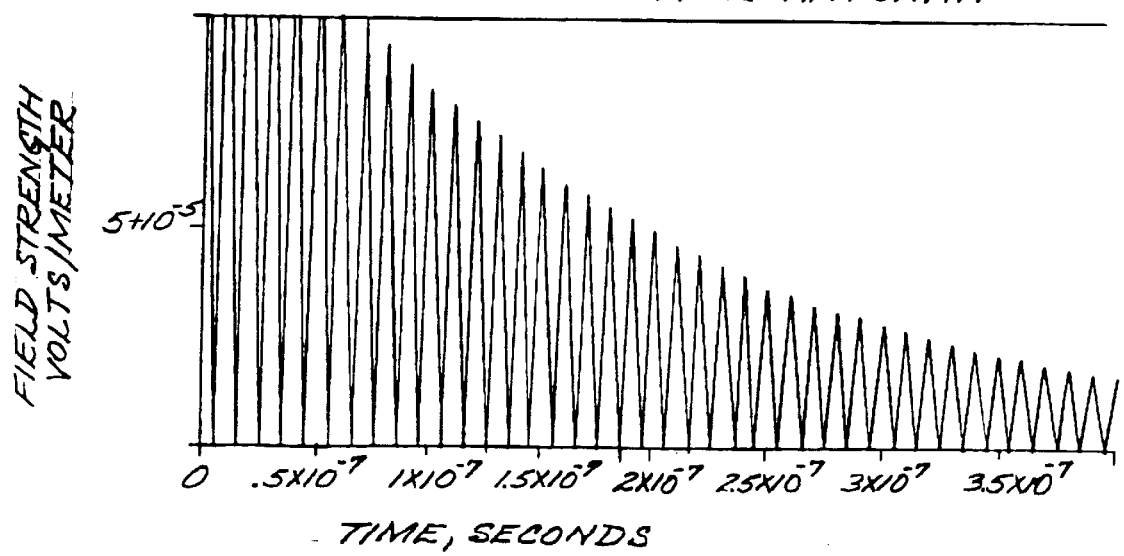
FIG. 9 FIELD INTENSITY AT RECEIVER ANTENNA
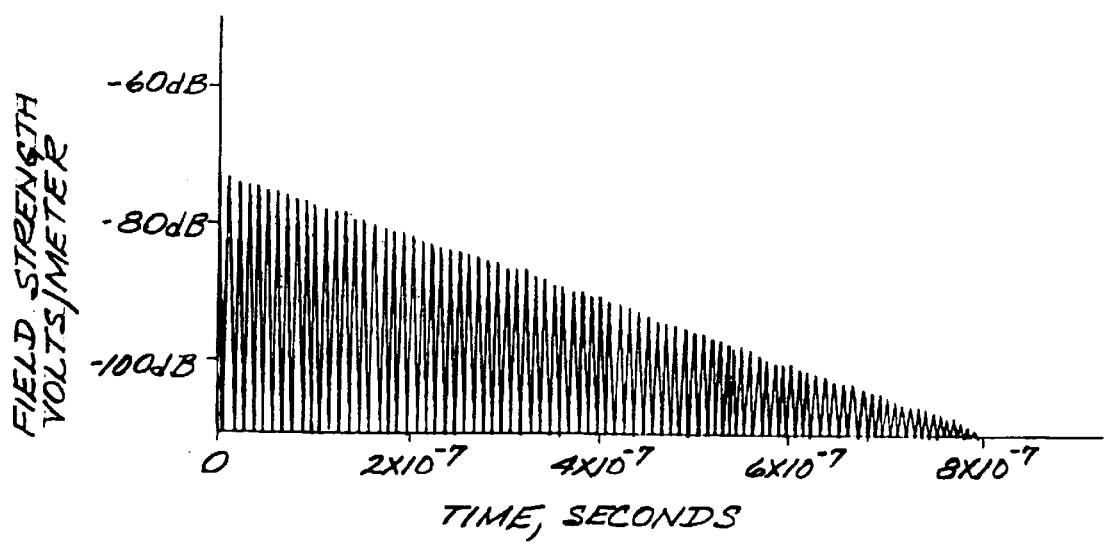
FIG. 10 FIELD POWER AT RECEIVER ANTENNA

SYSTEM FOR LOCATING GOLF BALLS

BACKGROUND OF THE INVENTION

1. Field of the Invention

The present invention relates to the field of movable object location systems generally and more particularly to a system utilizing an advanced radio frequency detection method for detecting the location of golf balls.

2. Description of the Prior Art

Golf is an increasingly popular game typically played in teams of two or four. The course of play typically consists of nine or eighteen holes with each hole consisting of a length of course a few hundred yards long beginning with a "tee" and ending in a "green" which contains the "hole". Golf is controlled by a number of intricate rules one of which requires a player who loses a ball to take a penalty stroke which harms that player's score. Thus, players are understandably reluctant to take a penalty stroke without making a time consuming effort to find the lost ball. However, since only one team can play a "hole" at any given time, the number of teams on the course and the speed of play is limited to that of the slowest moving team. If one team stops play because a particular player is searching for a lost ball, all of the teams behind them are forced to stop play as well. This directly conflicts with the desire of teams waiting to continue play and with the financial incentives of golf course mangers who prefer to have teams moving at swift pace through the course. Because of these conflicting goals many courses have adopted a five minute search rule. If a ball cannot be located after five minutes a player is forced to take a penalty stroke. Most commonly golf balls are lost during the course of play because the ball lands in a particularly overgrown area of the course. The loss can occur even though the ball was visible during its entire flight and the approximate region in which the ball landed is known. Thus, there have been many attempts at developing a device or method for finding a lost golf ball.

Early attempts at developing a golf ball location device have included U.S. Pat. No. 1,583,721, issued to Kane, May 4, 1926. Kane disclosed a smoke signaling device wherein a golf ball emitted a smoke signal prior to being hit. The golfer, after lighting a fuse, could track his ball by watching the smoke trial left in the air. Another early attempt was U.S. Pat. No. 1,620,290, issued to Rubin, Mar. 8, 1927. This device comprised a golf ball which contained a spring powered bell. Prior to hitting the ball, the golfer would wind the spring which would start the bell ringing. A more recent suggestion is British Patent No. 1,121,630, issued to Pedrick, Jul. 31, 1968. Pedrick suggested manufacturing a golf ball with a radioactive core. The golf ball when lost could then be located by means of a gas filled counting tube to detect the radioactive rays such as a Geiger counter. These early attempts are provided as an illustration of the long felt and as yet unmet need for an effective method of locating a lost golf ball.

The modern prior art concepts can be divided into two categories, electronic golf balls and remote sensing systems. In the electronic golf ball category there are generally two approaches, golf balls incorporating battery powered radio transmitters and golf balls incorporating battery powered audio beepers. An example of the radio transmitter approach is U.S. Pat. No. 3,782,730 entitled "Golf Ball", issued to Horchler, Jan. 1, 1974. This patent discloses a miniature, battery powered, radio transmitter enclosed within a golf ball. Horchler uses a small mercury cell, similar to a watch or camera battery, which powers a squegging oscillator type transmitter circuit. The battery and circuit are encapsulated within the golf ball. There are several inherent problems with the Horchler device. One problem is that the battery being encapsulated within the golf ball cannot be replaced. Therefore, when the battery fails a relatively expensive golf ball must be thrown away. It is also questionable whether a small mercury cell could supply sufficient power to generate a transmitter signal providing sufficient range to be practical during actual play. Further there is reason to doubt whether the active components of the Horchler device could survive the repetitive shock loads transmitted to a golf ball during a typical game.

An example of the audio beeper approach to locating a lost golf ball is U.S. Pat. No. 5,112,055 entitled "Golf Ball Including Sound Emitting Means", issued to Barnhill, May 12, 1992. The Barnhill golf ball contains a battery operated audio beeper circuit which includes a latch type switch. Upon being struck, the force of the blow imparted to the ball closes the switch causing the ball to emit an audible beep. By means of the continuous beeping the golfer may locate his ball. The beeper is turned off by pressing a golf tee through a hole inside the golf ball and thereby resetting the latch switch to the off position. While an interesting idea. Barnhill has numerous potential drawbacks. If the beeper signal is loud enough to allow a golfer to locate a lost ball from a distance of one hundred or more yards it is likely to prove annoying to other golfers. On the other hand if the beeper is quiet enough not annoy other golfers it is not likely to be loud enough to allow the golfer to find the lost ball. Further, as with Horchler, the life of the Barnhill golf ball is limited to the life of the battery and once again it is questionable whether the active components can withstand the repetitive shock loads imparted to a golf ball during the course of play.

Of the remote sensing methods for locating golf balls disclosed in the prior art there are three main types, proximity sensors, optical systems based on charge coupled device (CCD) sensors, and radar type systems. An example of the proximity sensor approach is U.S. Pat. No. 4,660,039, entitled "System For Locating A Sport Object", issued to Barricks et al., Apr. 21, 1987. Barricks discloses a low frequency radio transmitter and a golf ball wherein strips of conductive material are placed around the perimeter of the ball. Barricks operates on the well known principle that when an electromagnetic (EM) field comes into contact with a conductor an electrical current commonly referred to as an "eddy current" is induced in the conductor. When the EM field first contacts the conductor, the induced current causes the transmitter to see an increased load or power drain. A proximity sensor included with the transmitter senses the increased power drain and thereby the presence of the ball can be inferred. The primary disadvantage of this approach is that proximity to a conductor produces only a slight power drain on a transmitter. Therefore, even very sensitive proximity sensors require that the transmitter and conductor be in close spacial relation in order to generate a detectable differential in power drain. In industrial applications proximity sensors have an effective range of a few inches to about two feet. In actual practice, a golf ball locator based on a proximity sensor approach would likely be limited to a similarly short effective range.

An example of the CCD approach is U.S. Pat. No. 5.662,533, entitled "Golf Ball Locator Apparatus", issued to Chadwell, Sep. 2, 1997. Chadwell teaches a system comprising a hand held infrared light source which includes an array of charge coupled devices designed to be particularly sensitive to infrared light, a golf ball coated with a clear coating that is formulated to be highly reflective of infrared light, and circuitry capable of detecting reflected infrared light. One disadvantage of the Chadwell method is that infrared radiation will not penetrate foliage. Thus if the lost golf ball is obscured by grass, leaves, brush or other type of foliage the detection system taught by Chadwell will not be effective.

An example of the radar approach to golf ball detection is U.S. Pat. No. 5,662,534, entitled "Golf Ball Finding System", issued to Kroll et al., Sep. 2, 1997. The system taught by Kroll uses radar principles well known to those skilled in the art. Kroll discloses a hand held radar transponder and a four quadrant corner reflector encapsulated within a golf ball. Kroll teaches that radar waves impinging on the reflector at an oblique angle will, after multiple reflections within a quadrant, be reflected directly back to the radar source. Kroll estimates, by calculation, that to locate a golf ball by radar means using the disclosed four quadrant reflector a minimum transmitter frequency of 15 Ghz would be required. Kroll further calculates that an effective range of 500 feet could be obtained at this frequency and that the transponder could be powered by ordinary dry cell batteries "as is done with a flashlight." While detection of a golf ball by radar means is quite feasible, it is highly questionable whether a transmitter operating at 15 Ghz could be powered by a sufficiently small number of ordinary dry cell batteries such that the device could be hand held. Further, it is questionable whether an impinging radar wave striking the reflector at an oblique angle will be reflected directly back to the transmitter as is required for the Kroll device to operate. In addition, a four quadrant corner reflector would cut through the core of the golf ball severing it into fourths, thereby ruining its flight characteristics.

Although the prior art discloses a multitude of systems for locating a lost golf ball, all of the methods taught possess certain drawbacks. Thus, it is clear that there remains room for improvement. What is needed therefore is a remote sensing golf ball location system of sufficiently low power consumption to be light weight and portable, and preferably hand held. In addition, such a system should not compromise the integrity of the golf ball bounce and flight characteristics. Further, such a system should possess sufficient range to be of practical utility and such a system should be able to locate a golf ball regardless of the ball's physical orientation on the course or whether the ball is obscured by foliage.

SUMMARY OF THE INVENTION

The present invention provides a system which may be employed for locating lost golf balls which includes a golf ball that incorporates an array of passive transponders and a radio frequency ("RF") transmitter/receiver capable of energizing the passive array and of detecting a signal emitted by the array. Each passive transponder is a capacitively loaded flat-loop inductor of predetermined configuration. The array comprises three flat-loop inductors arranged in a predetermined spatial relationship within the interior of a golf ball. Each flat-loop inductor functions as a tuned LC circuit that is charged by the RF transmitter/receiver and emits a radio frequency signal, detectable by the transmitter/receiver, for a finite period of time after the RF transmitter/receiver is turned off.

It should be noted that the present invention does not utilize radar principles. The amount of RF energy emitted by the passive transponders is orders of magnitude greater than that which would be reflected back from the conductive surfaces contained within the golf ball by an impinging electromagnetic wave. With our device, RF energy is emitted from the surface of the golf ball for hundreds of nanoseconds after the RF energy from the transmitter is no longer striking the surface of the ball. Therefore, the emissions are not radar, since radar emissions from a target stop as soon as the energy from the radar transmitter is shut off.

The present invention possesses several advantages over the prior art. The passive array incorporated in the golf ball of the present invention contains no conventional electronic components and is therefore impervious to the impact loading produced by hitting a golf ball during the normal course of play. Further, the signal emitted by the passive array is omni-directional and therefore detectable by the transmitter/receiver regardless of the orientation of the golf ball on the course. Also, the present invention can detect a golf ball incorporating the passive array regardless of whether the ball is obscured by foliage. In addition, the RF transmitter/receiver of the present invention possesses sufficient transmitter power to provide an effective range of at least 100 feet, yet power consumption is sufficiently low such that the transponder/receiver can be operated with ordinary dry cell batteries. Other features and advantages of the invention will become apparent from the following detailed description.

BRIEF DESCRIPTION OF THE DRAWINGS

For a better understanding of the invention and the features thereof, reference is made to the following description which is to be read in conjunction with the accompanying drawings wherein:

FIG. 1 is a perspective view of a location system embodying the present invention;

FIG. 2 is a diagrammatic view of the golf ball shown in FIG. 1., enlarged in scale, an emitter array composed of flat-loop inductors is shown in solid line, while the golf ball cover is shown in phantom line;

FIG. 3 is a perspective view, enlarged in scale, of one of the flat-loop inductors which form the emitter array shown in FIG. 2;

FIG. 4 is a partial front view, enlarged in scale, of the slot portion of the flat-loop inductor shown in FIG. 3;

FIG. 5 is a sectional view, enlarged in scale, of a cross section of the flat-loop inductor as taken along the line 5—5 in FIG. 3;

FIG. 9 is a graph showing the electro-magnetic field intensity in volts/meter of a signal returned from a flat-loop inductor at the antenna of FIG. 8;

FIG. 10 is a graph showing the electromagnetic field power in dbm of a signal returned from a flat-loop inductor at the antenna of FIG. 8;

DETAILED DESCRIPTION OF THE PREFERRED EMBODIMENT

Figure 11:
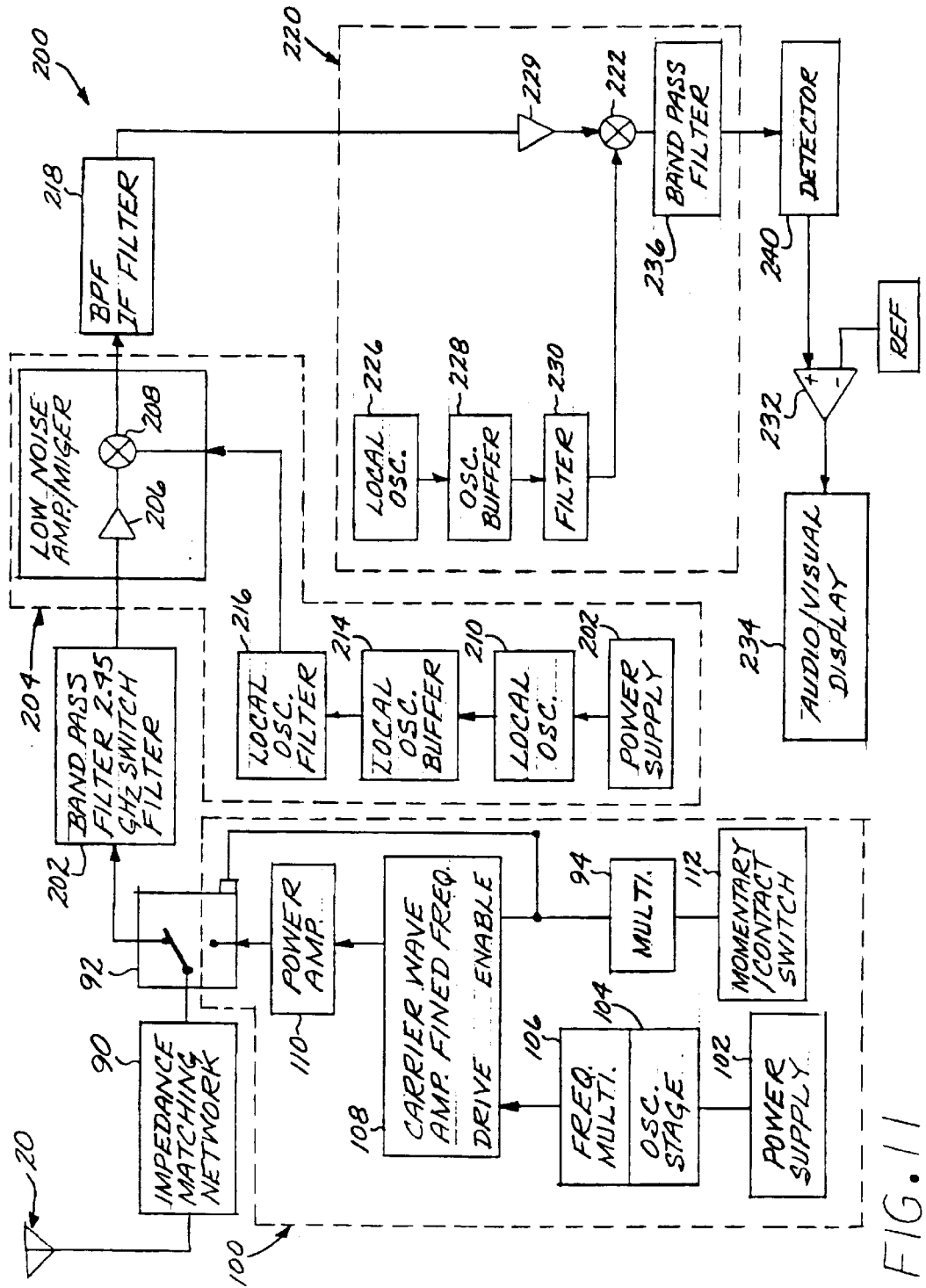
FIG. 11 is block diagram of transmitter and receiver circuits suitable for use in the RF transponder, shown in FIG. 1, of the present invention.

Referring to FIG. 1, the movable object location system of the present invention has particular application as a golf ball location system including a portable, hand held, radio frequency transmitter/receiver 10, and a golf ball of unique design 30. The transmitter/receiver includes generally, a single housing which houses, a battery pack 16, a high gain helical antenna 20, and as shown in FIG. 11, a transmitter circuit 100, and a receiver circuit 200.

Referring to FIG. 2, the golf ball includes a core 31, a cover 32 and disposed between the cover and the core is a passive inductor array, generally designated 36. The array includes three passive transponders in the form of flat-loop inductors, generally designated 33. The core and the cover are composed of conventional materials well known to those skilled in the art of golf ball manufacture. Referring now to FIGS. 3, 4 and 5, each flat loop inductor 33 is formed as a discontinuous flat loop 40 of generally circular configuration and of rectangular cross section. The flat loop 40 has planar oppositely facing flat faces 34. In the preferred embodiment, each loop possesses an outside diameter d of 0.600 inches and a width b of 0.050 inches. The discontinuous portion of the loop forms a narrow diagonal slot 37, of predetermined angle α and gap p. The slot 37 is formed with substantially parallel confronting edges. In the preferred embodiment, the slot angle α is 22.5 degrees and the slot gap p is 0.004 inches. The preferred material for the loop is copper foil, with a thickness c of 0.0028 inches, which is laminated to a KAPTON substrate. It is to be understood that only the presently preferred configuration for the passive transponder has been described. The transponder is not limited in configuration to a flat circular loop but may be of ellipsoidal or of non-circular configuration. Further, the loop material is not limited to copper but rather may be of gold, silver, aluminum. vapor deposited metal, or of any other conductive material which is capable of being formed into a thin foil or film. The substrate also is not limited to KAPTON but may be of any suitable electrical insulating material.

The helical transmitter antenna of the hand held unit emits an electromagnetic field at 2.45 Ghz. The passive transponder in the golf ball is a Loop of copper ideally shaped and dimensioned to be a 0.39 wavelength antenna at 2.45 Ghz. The electrical aperture of the Loop is larger than the physical copper surface of the Loop. In fact, a 0.39 wavelength antenna is ideal because it propagates a larger electrical aperture for its size. The electrical aperture includes the entire center of the Loop as well as an area around the Loop, since it is an antenna.

The current flow in the loop (antenna) is dependant upon (1) the power density of the impinging field (from the transmitter); and (2) the aperture presented by the loop antenna, and therefore the dimensional geometry of the Loop.

Power Density of the Impinging Field

The formula set below (labeled Propagation) has been employed to calculate that a one watt 2.45 Ghz transmitter with our selected design helical transmitter antenna will propagate an e-field strength (Eo) of 0.013387 volts per meter at a distance of 300 feet (91.44 meters).

Aperture of the Loop Antenna

The formula set below (labeled Loop Oscillation) shows that for a Loop antenna of our dimensions (C) spaced in a 2.45 Chz e-field (at 300 feet from the transmitter), the 2.45 Ghz e-field will induce a current flow (I) of 9.4 E-4 amperes. The value is independent of the inherent inductance or capacitance of the antenna structure. The ability for the antenna to "pick-up" this much current from such a long distance with such a physically small antenna is key to the range of our invention. The e-field is a 2.45 Ghz oscillation and continues to stimulate the antenna with in-phase stimulus tuned to the antenna's frequency, energizing the antenna to a higher energy state; much like a sound wave of a particular musical note, continuing to re-enforce the vibrations of tuning fork for that same musical note.

Energy Storage

Antennas have an inherent inductance whether thy be a rod (dipole antenna) or loop. The inductance of the loop (L) is calculated below to be 5.412 E-8 Henries. (Refer to formula labeled "Loop Inductance and Capacitance).

The energy (UB) coupled into the inductance of the Loop antenna is a function of the Loop current flowing through the inductance of the Loop while the Loop antenna is energized by the field. The energy in the Loop is calculated to be 2.391E-14joules. (See formula 3 under Loop Oscillations.)

The ends of the Loop antenna face each other and form a narrow diagonal slot 37 that is filled with a compound that acts as a dielectric and in conjunction with the faces of the slot functions as a capacitor with a value of 0.078 picofarads. (Refer to (C) formula labeled Loop Inductance and Capacitance.) The capacitance value was picked to tune the combination of the capacitive reactance and inductive reactance of the Loop antenna to 2.45 Ghz.

The current flowing through the Loop charges the capacitor to a maximum level of 6.106E-14 Coulombs (q), thus storing capacitive energy. (See formula 4 in formula set labeled Loop Oscillation.)

Charging the Loop

As long as the loop antenna is impinged upon by the 2.45 Ghz field, the Loop antenna continues to be energized by the field, converting the field oscillations to current in the antenna Loop alternately in one direction (positive cycle) charging the capacitor and then inducting current in the Loop in the opposite direction (negative cycle) where the capacitor discharges into the Loop adding to the current induced by the negative phase of the field and then the capacitor is recharged in the negative cycle as the negative current peaks in the Loop antenna. In this way, the Loop and the capacitor exchange energy driven by the 2.45 Ghz field.

Loop Radiation After Transmitter Turned Off

Once the hand held transmitter/receiver turns off, and the impinging field stops, the Loop antenna continues to exchange energy between the capacitor and the inductance of the Loop antenna at its tuned 2.45 Ghz rate, but now the current flowing through the Loop is no longer reconstructed by an outside energizing field. Instead the current flowing through the Loop antenna dissipates an e-field around the Loop antenna at a rate of 2.45 Ghz. When current flows in a positive direction the field builds up around the Loop, some energy is dissipated as RFI that the hand held receiver can detect. However when the field collapses it induces current in the opposite direction in the Loop antenna (at a rate of 2.45 Ghz) charging the capacitor in the negative polarity direction but with less energy. The Oscillation continues in the Loop antenna; however, the oscillation energy decays with each cycle, primarily due to the energy dissipated as an RF Field.

The formula below calculate:
1. The Oscillation decay formula in the loop (qe(n)) in coulombs over time along with a graph labeled FIG. 7.
2. The resulting e-field strength formula at the hand held receiver antenna (Es(n)) in volts/meter over time and its decay with a graph labeled FIG. 9.
3. The Field Power formula at the hand held receiver antenna (Ss(n)) in dbm over time and its decay with a graph labeled FIG. 10.

As will be appreciated by those skilled in the art, all of the calculations for single Loop Antenna apply directly to the three Loop quasi-isotropic array since the array has the same field strength as a single Loop but functions from any orientation.

With reference to FIGS. 3, 4, and 5, the loop inductance, capacitance, resonant frequency and oscillation decay time are calculated as follows. The physical constants used in the calculations and a calculation of the loop (conductor) total length are summarized in Table 1.

Note for discussion of the impinging electro-magnetic field intensity see the antenna design and signal propagation calculations; infra pages 32 and 34.

TABLE 1

Physical Constants

| | | | |
|---|---|---|---|
| $\zeta_i := \pi \cdot d_i$ | conductor total length, in | $\zeta_i = 1.885$ | |
| $\zeta := .0254 \cdot \zeta_i$ | conductor total length, meters | $\zeta = 0.048$ | |
| $\mu_o := 4 \cdot \pi \cdot 10^{-7}$ | permeability free space, H/m | $\mu_o = 1.257 \cdot 10^{-6}$ | |
| $\varepsilon_o := \dfrac{1}{36 \cdot \pi \cdot 10^9}$ | permittivity free space, F/m | $\varepsilon_o = 8.842 \cdot 10^{-12}$ | |
| $\sigma := 5.8 \cdot 10^7$ | conductivity copper, S/m | | |
| $a := \dfrac{d-c}{2}$ | mean radius, meters | $a = 7.584 \cdot 10^{-3}$ | |
| $c_o := \dfrac{1}{\sqrt{\mu_o \cdot \varepsilon_o}}$ | speed light, m/s | $c_o = 3 \cdot 10^8$ | |
| $\lambda_o := \dfrac{c_o}{f}$ | free space wavelength (fs-λ), meters | $\lambda_o = 0.122$ | |

The geometric data for the preferred embodiment of the loop inductor along with the design frequency and dielectric constant of the capacitor's gap material are summarized in Table 2.

TABLE 2

Geometric Data

| | | |
|---|---|---|
| diameter of core (O.D.), in | $d_i := .60$ | $d := .0254 \cdot d_i$ |
| conductor thickness, in | $c_i := .0028$ | $c := .0254 \cdot c_i$ |
| conductor width, in | $b_i := .050$ | $b := .0254 \cdot b_i$ |
| gap width, inches | $p_i := .004$ | $p := .0254 \cdot p_i$ |
| gap error spread, inches | $p_{i\delta} := .0002$ | $p_\delta = 0254 \cdot p_{i\delta}$ |
| frequency, Hz | $f := 2.45 \cdot 10^9$ | |
| dielectric constant | $\varepsilon_r := 3.8$ | |
| diameter of core (O.D.), meters | $d = 0.015$ | |
| conductor thickness, meters | $c = 7.112 \cdot 10^{-5}$ | |
| conductor width, meters | $b = 1.27 \cdot 10^{-3}$ | |
| gap width, meters | $p = 1.016 \cdot 10^{-4}$ | |
| gap error spread, meters | $p_\delta = 5.08 \cdot 10^{-6}$ | |
| frequency, Hz | $f := 2.45 \cdot 10^9$ | |
| dielectric constant | $\varepsilon_r := 3.8$ | |

Loop Inductance

Where $L_{ext}$ is the inductance produced by flux coupling around the perimeter of the loop and $L_{int}$ is the inductance produced by an equivalent length of straight conductor.

$$L_{ext} := \frac{\mu_o \cdot a \cdot \left(a - \frac{c}{2}\right)}{2} \cdot \int_0^{2\pi} \frac{\cos}{\sqrt{a^2 + \left(a - \frac{c}{2}\right)^2 - 2 \cdot a \cdot \left(a - \frac{c}{2}\right) \cdot \cos(\phi)}} d\phi \quad L_{ext} = 5.172 \cdot 10^{-8}$$

$$L_{int} := \frac{\mu_o \cdot \left(a + \frac{c}{2}\right)}{4} \quad \text{internal inductance, Henries} \quad L_{int} = 2.394 \cdot 10^{-9}$$

$$L := L_{ext} + L_{int} \quad \text{total inductance, Henries} \quad L = 5.412 \cdot 10^{-8}$$

Loop Capacitance $$C := \left(\frac{1}{2 \cdot \pi \cdot f}\right)^2 \cdot \frac{1}{L} \quad \text{capacitance, Farads} \quad C = 7.798 \cdot 10^{-14}$$

$$b_c := \frac{p \cdot C}{\varepsilon_o \cdot \varepsilon_r \cdot c} \quad \text{capacitor face length, m} \quad b_c = 3.315 \cdot 10^{-3} \quad b_c = 0.13053 \, \frac{1}{m} \cdot \text{in}$$

$$\alpha_p := \operatorname{asin}\left(\frac{b}{b_c}\right) \quad \text{gap angle to edge, radians} \quad \alpha_p = 0.393 \quad \alpha_p = 22.523 \cdot \deg$$

$$C_e := \frac{c \cdot b_c \cdot \varepsilon_o \cdot \varepsilon_r}{p + p_\delta} \quad \text{capacitance with dimensional tolerance added} \quad C_e = 7.426 \cdot 10^{-14}$$

Loop (Oscillation) Frequence

-continued $$f_e := \frac{1}{2\cdot\pi\cdot\sqrt{L\cdot C_e}} \quad f_o := \frac{1}{2\cdot\pi\cdot\sqrt{L\cdot C}} \quad f_e = 2.511\cdot 10^9 \quad f_o = 2.45\cdot 10^9$$

$f_\delta := (f_e - f_o)\cdot 10^{-6}$   total frequency deviation due to gap tolerance, MHz   $f_\delta = 60.503$ MHz Loop Resistance $$C_\lambda := \zeta\cdot\frac{f}{c_o} \quad \text{circumferance in wavelengths} \quad C_\lambda = 0.391$$

$$\delta := \frac{1}{\sqrt{\pi\cdot f\cdot \mu_o\cdot \sigma}} \quad \text{skin depth, meters} \quad \delta = 1.335\cdot 10^{-6}$$

$$R_{dc} := \frac{1}{\sigma\cdot(b\cdot c)} \quad \text{low-frequency conductor resistance, } \Omega/m \quad R_{dc} = 0.191$$

high-frequency conductor resistance, $\Omega/m$ $$R_{hf} := \frac{1}{\sigma\cdot((b\cdot c) - ((b\cdot c) - (b-\delta)\cdot(c-\delta)))} \quad R_{hf} = 0.195$$

$$R_r := 60\cdot\pi^2\cdot C_\lambda\cdot\int_0^{C_\lambda} Jn(2\cdot y)\,dy \quad \text{radiation resistance, } \Omega \quad R_r = 0.572$$
$(Jn = \text{2nd order Bessel function})$ $$R := R_{hf}\cdot\zeta + R_r \quad \text{conductor resistance, } \Omega \quad R = 0.582$$

Loop Oscillation Decay Calculation

Figure 7:
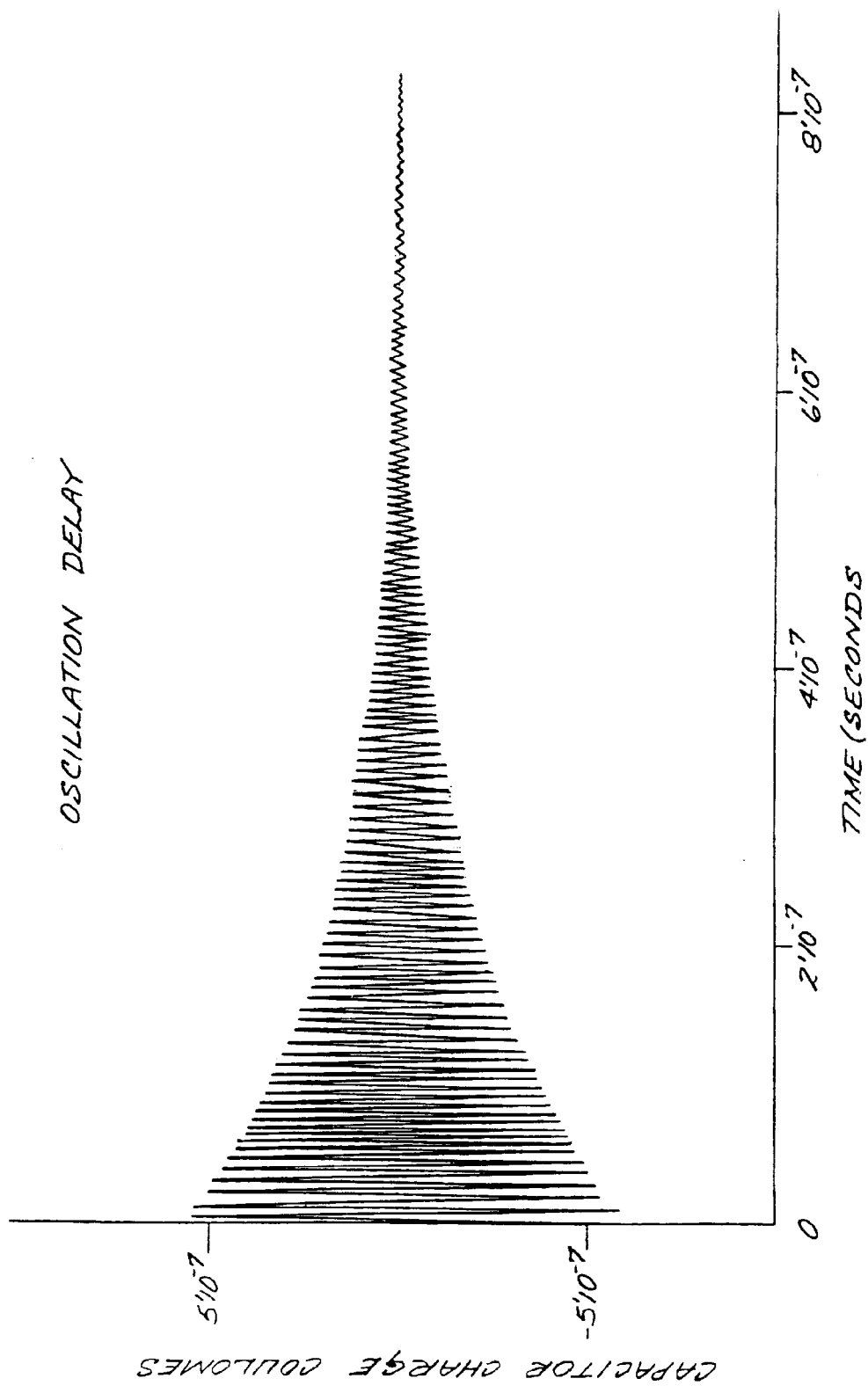
FIG. 7 is a graph depicting the rate of oscillation decay of the flat-loop inductor of FIG. 3.

Referring now to FIG. 7, each flat-loop-inductor is constructed so that it continues to oscillate and emit an RF signal for a finite period of time after the illuminating source RF signal is turned off. The rate of oscillation decay is as determined as follows. Note, represents the impinging electromagnetic field intensity at the loop-inductor. This calculation is illustrated with the RF transponder antenna design.

| | | |
|---|---|---|
| $C_\lambda := \frac{\zeta}{\lambda} \quad C_\lambda = 0.391$ | loop wavelength circumference, $\lambda$ | |
| $I := \frac{E_\phi\cdot r}{60\cdot\pi\cdot C_\lambda\cdot J1(C_\lambda\cdot\sin(\theta))}$ | induced current, amperes (J1 = Bessel function) | $I = 9.4\cdot 10^{-4}$ |
| $U_B := \frac{1}{2}\cdot L\cdot I^2$ | energy coupled to inductor | $U_B = 2.391\cdot 10^{-14}$ |
| $q := I\cdot\sqrt{L\cdot C}$ | charge on capacitor, max | $q = 6.106\cdot 10^{-14}$ |
| $U_E := \frac{1}{2}\cdot\frac{q^2}{C}$ | energy stored by capacitor | $U_E = 2.391\cdot 10^{-14}$ |

Rate of oscillation decay calculation $n:=0, 0.001 \ldots 2 \quad t(n):=n\cdot 10^{-6}$ corrected angular frequency; note that loop resistance changes oscillation frequency by an insignificant amount $$\omega' := \sqrt{\frac{1}{L\cdot C} - \left(\frac{R}{2\cdot L}\right)^2}$$

$$f' := \frac{\omega'}{2\cdot\pi}$$

$$f' = 2.449999851\cdot 10^9 \text{ Hz } (L\text{-}C\text{-}R)$$

-continued $$f = 2.45\cdot 10^9 \text{ Hz } (L\text{-}C)$$

$$q_e(n) := q\cdot e^{-\frac{R\cdot t(n)}{2\cdot L}}\cdot\cos(\omega'\cdot t(n))$$

From FIG. 7, it can be seen that for the preferred embodiment the flat-loop-inductor continues to emit an RF signal for substantially 800 nanoseconds after discontinuation of the illuminating source signal.

As described, during each resonate cycle each flat-loop-inductor 33 emits a circularly polarized directional RF signal in a direction substantially parallel to the plane of each loop. Therefore, in order to generate a substantially omnidirectional response to an incoming RF signal three passive transponders are arranged in an array along three mutually perpendicular axes such that each transponder is equidistant from the point of intersection of the three axes and each transponder is perpendicular to each of the other transponders. Such an arrangement will produce a quasi-isotropic response from the array. The array's response is quasi-isotropic because although the array will respond when illuminated with a 2.45 ghz signal from any angle, signal intensity is detectably stronger at points coplanar with one of the flat-loop inductors.

Because of the variation in signal intensity it is possible to gain additional information besides golf ball location. For example, in flight rotation of a golf ball incorporating the above described array will produce a degree of amplitude modulation in the RF signal. Circuitry may be incorporated into the RF transponder that will detect and decode the resulting amplitude modulation. This decoded signal can be used to provide a golfer with ball spin information that will allow the golfer to determine the degree of hook or slice applied to the ball.

It should also be noted that the above described array can be tuned to a frequency which is not exactly the same frequency as the transmitter which illuminates and energizes the array. The tuned frequency of the array would be close enough to the transmitter frequency that the transmitter would still energize the array, but the array would radiate at a frequency sufficiently separate from the transmitter that a continuous wave receiver with a very narrow bandpass could detect the array. In addition, those skilled in the art will appreciate that frequency doubling techniques can be used with the passive transponder of the present invention.

In the preferred embodiment the array of flat-loop inductors described above is formed on the surface of a golf ball core. However, it would be equally effective to encapsulate the array within a golf ball core or to form the array on the inner or even the outer surface of the ball jacket. Other manufacturing variations are also possible as will occur to those skilled in the art.

Through prototype testing and sophisticated computer modeling it has been determined that when illuminating a golf ball embodying the present invention with a 2.45 Ghz signal from a transmitter with a broadcast power of one watt an effective detection range of 300 feet can be achieved with a sufficiently sensitive receiver. At a power consumption of approximately one watt, ordinary dry cell batteries, of a type readily available to consumers, are able to supply sufficient power to operate the RF transponder for a period of several hours. Since only intermittent use is anticipated during the course of play, it will be appreciated that the RF transponder will have a long battery life thereby increasing its utility to golfers.

Referring to FIG. 11, the RF transponder incorporates discrete transmitter 100 and receiver 200 circuits which utilize the same antenna 20. Switching between the circuits is accomplished by means of an RF switch 92. The transmitter is comprised of a power supply 102 which provides power to an oscillator which venerates a sine wave output at a sub-harmonic of the broadcast frequency. A frequency multiplier 106 boosts the oscillator output to the desired broadcast frequency. The frequency multiplier drives an amplifier 108 which produces a continuous non-modulated carrier wave at the frequency of the multiplier 106 output. Those skilled in the art will appreciate that the amplifier 108 may be driven directly by an oscillator operating at the broadcast frequency, thus skipping the frequency multiplier, at the concurrent expense of increased power consumption. The output of the carrier wave amplifier 108 is further boosted by power amplifier 110. The maximum continuous transmitter broadcast power is one watt at a frequency of 2.45 Ghz for the hand-held unit shown.

With continued reference to FIG. 11, to overcome the difficulties involved in detecting and amplifying modulated high frequency carrier wave signals, the receiver circuit 200 includes two "step down", intermediate frequency (IF), amplifier stages. The incoming antenna or carrier signal first passes through a band pass filter 202. The band pass filter (BPF) selectively passes signals at the transmitter frequency which corresponds to the frequency emitted by the passive array 36. By selectively passing signals at the transmitter frequency only, the BPF minimizes false echoes that may be generated from extraneous RF sources located on or near the golf course.

The filtered antenna signal passes to a first amplifier/mixer stage, generally designated 204. The first amplifier/mixer stage "steps down" the incoming signal to a first intermediate (IF) frequency. The first IF frequency is itself "stepped down" to a second IF frequency which can be detected and used to drive an audio/visual display.

Again referring to FIG. 11, the first amplifier/mixer stage 204 functions as follows: The filtered antenna signal passes through a low noise amplifier 206 thereby boosting the signal strength to a point sufficient to overcome the noise produced by the subsequent circuit stages. The boosted antenna signal, is injected into a heterodyne mixer 208 where it is combined with a signal originating from a local oscillator 210. The heterodyne mixer subtracts, in a nonlinear manner, the local oscillator frequency from the carrier frequency to produce a first "stepped down" IF frequency or difference frequency, also commonly referred to as a "beat" frequency.

The local oscillator 210 generates a sine wave output which is fed into a buffer amplifier 214. The buffer amplifier serves to isolate the local oscillator from the mixer load and thereby improve the local oscillator's frequency stability. The buffer amplifier's output passes through a ceramic filter 216, which filters out power supply and other extraneous circuit noise and thereby provides a clean signal to the heterodyne mixer 208.

Coupling between the first amplifier/mixer stage 204 and the second amplifier/mixer stage, generally designated 220, is accomplished by means of a first IF band pass filter 218, tuned to selectively pass frequencies at the first IF frequency. The filter selects the mixer product transferred to the second IF amplifier/mixer stage and prevents off channel signals caused by intermodulation of the carrier and local oscillator from entering the second stage. Off channel signals represent the sums and differences of integer multiples of components of the original intermixed or heterodyned waves.

The output from the first IF band pass filter passes into a second amplifier stage, generally designated 220. The second stage amplifier/mixer "steps down" the first IF frequency producing a second IF signal which is of sufficiently low frequency to drive an audio/visual display. The second amplifier/mixer stage 220 functions in a manner similar to the first amplifier/mixer stage 204, as follows: The incoming first IF signal is amplified by a low noise amplifier 229 and is injected into a heterodyne mixer 222. A local oscillator 226 produces a sine wave output which is isolated from the mixer load by a buffer 228 and from which power supply noise is filtered out by a local oscillator filter 230. The now clean waveform which is of a frequency comparatively less than the first IF frequency is fed into the second mixer 222. The resulting mixer output is the second IF frequency. The second IF frequency is fed into a band pass filter 236 where off channel frequencies are blocked out. The now filtered second IF frequency enters a detector 240 which generates a signal strength indicator output suitable for driving an LED readout, an audio beeper, or other type of signaling device. The detector output passes to a comparator 232 which compares the detected signal to a reference signal. If the strength of the detected signal is sufficient to indicate the location of a golf ball, the audio/visual display 234 is activated.

Switching between the transmitter and receiver is accomplished by means of a high speed single pole double throw RF switch 92. An impedance matching network 90 may be placed between the antenna and the switch in order to match antenna and circuit impedance. Switching frequency is controlled by a multivibrator 94. The multivibrator cycles the switch between the transmitter and receiver circuits. The vibrator time constant is substantially equal to the sum of the time required for a transmitted signal to travel 100 feet, for the passive array to energize and emit a signal, and for an emitted signal to travel back to the antenna. The multivibrator is turned on by means of a momentary contact switch 112.

Those skilled in the art will appreciate that the circuits disclosed in FIG. 11 represent one practical embodiment of transmitter and receiver circuits suitable for use in the RF transponder of the present invention and that variations of these circuits are possible. It will also be appreciated that the circuits may utilize individual components for each functional element or may consist of monolithic integrated circuits incorporating multiple functions.

Figure 6:
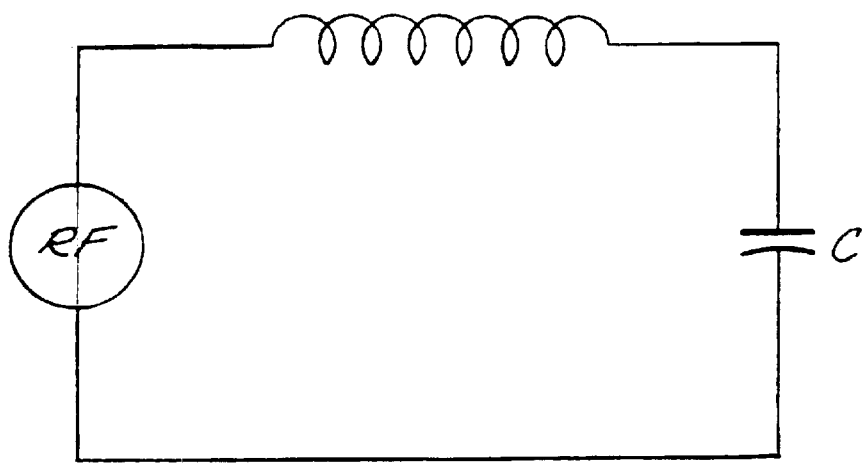
FIG. 6 is a schematic circuit showing the idealized capacitive and inductive elements of the flat-loop inductor shown in FIG. 3.
Figure 8:
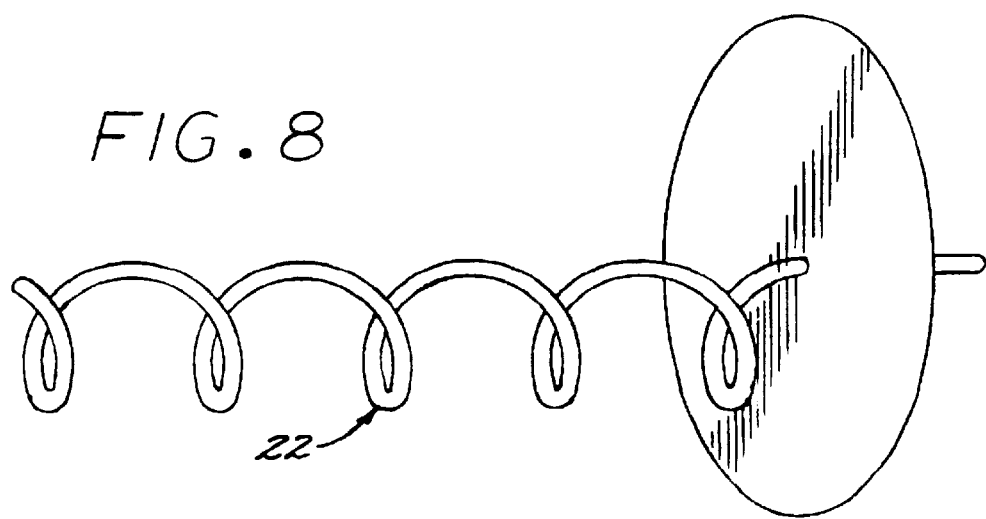
FIG. 8 is a generalized perspective view, enlarged in scale, of an antenna included in the RF transponder shown in FIG. 1.

Referring to FIG. 8, the antenna 20, incorporated in RF transmitter/receiver 10, is of a helical, directional design, of 140 ohm impedance, tuned for maximum gain (16 dB) at a frequency of 2.45 Ghz. The antenna develops a radiation pattern of approximately 30 degrees and is circularly polarized. Circular polarization allows the antenna to be energized by a passive transponder emission regardless of the spacial orientation of the emitted signal. The antenna is physically constructed as a single coil nine turn helix 22 with a diameter of 1.642 inches and a pitch angle of 14 degrees utilizing 0.102 inch diameter wire. The antenna utilizes a ground plane of substantially 2.41 inches. In the preferred embodiment the coil is wound onto a form and encapsulated in a durable plastic material by means of an injection molding process.

The geometric data needed to perform the antenna design calculations are summarized in Table 3. Reference should also be made to Table 1 Physical Constants.

TABLE 3

Geometric Data For Antenna Design Calculations

| | | |
|---|---|---|
| transmit antenna frequency, Hz | | $f_{ant} := 2450 \cdot 10^6$ |
| distance separating antenna and sensor, feet | | $d_f := 300$ |
| transmitter power to antenna, watts | | $S_{tt} := 1$ |
| helix diameter, in | | $D_{ain} := 1.642$ |
| conductor diameter, inches | | $d_{win} := .102$ |
| Number of turns | | $N := 9$ |
| Pitch angle, degrees | | $\alpha_d := 14$ |

Antenna Design Calculations

| | | |
|---|---|---|
| $D_a := .0254 \cdot D_{ain}$ | helix diameter, meters | $D_a = 0.042$ |
| $d_w := .0254$ | conductor diameter, meters | $d_w = 2.591 \cdot ^{-3}$ |
| $\alpha := \frac{\alpha_d \cdot \pi}{180}$ | pitch angle, radians | $\alpha = 0.244$ |
| $\lambda_{ant} := \frac{c_o}{f_{ant}}$ | free-space wavelength (fs-$\lambda$), meters | $\lambda_{ant} = 0.12245$ |

Helix circumference range of $0.7 < C_\lambda < 1.4$ is valid for axial beam mode

| | | |
|---|---|---|
| $C_{\lambda ant} := \pi \cdot \frac{D_a}{\lambda_{ant}}$ | helix circumference, fs-$\lambda$ | $C_{\lambda ant} = 1.07$ |
| $C_c := C_\lambda \cdot \lambda_{ant}$ | | $C_c = 0.048$ m |
| $L_\lambda := \frac{C_{\lambda ant}}{\cos(\alpha)}$ | turn length, fs-$\lambda$ | $L_\lambda = 1.103$ |
| $L_c := L_\lambda \cdot \lambda_{ant}$ | | $L_c = 0.135$ m |
| $D_\lambda := \frac{C_{\lambda ant}}{\pi}$ | helix diameter, fs-80 | $D_\lambda = 0.341$ |
| $D_c := D_{80} \cdot \lambda_{ant}$ | | $D_c = 0.042$ m |

Antenna Design Calculations

Helix turn spacing range of $0.15 < S_\lambda < 0.5$ is valid for axial beam mode

| | | |
|---|---|---|
| $S_\lambda := \sqrt{L_\lambda^2 - C_{\lambda ant}^2}$ | helix turn spacing, fs-$\lambda$ | $S_\lambda = 0.267$ |
| $S := S_\lambda \cdot \lambda_{ant}$ | $S = 0.033$ m | |
| $A_\lambda := N \cdot S_\lambda$ | length of helix, fs-$\lambda$ | $A_\lambda = 2.401$ |
| $A := A_\lambda \cdot \lambda_{ant}$ | $A = 0.294$ m | |
| $B_{3dB} := \frac{52}{C_{\lambda ant} \cdot \sqrt{N \cdot S_\lambda}}$ | half power beam-width, degrees | $B_{3dB} = 31.361$ |

TABLE 3-continued

Geometric Data For Antenna Design Calculations

| | | |
|---|---|---|
| $B_{nul} := \frac{115}{C_{\lambda ant} \cdot \sqrt{N \cdot S_\lambda}}$ | beam-width, first null, degrees | $B_{nul} = 69.357$ |
| $G_{tt} := 15 \cdot C_{\lambda ant}^2 \cdot N \cdot S_\lambda$ | directivity | $G_{tt} = 41.239$ |
| $G_{dB} := 10 \cdot \log(G_{tt})$ | gain, dB (disregarding ant. efficiency) | $G_{dB} = 16.153$ |
| $Z_{in} := 140 \cdot C_{\lambda ant}$ | terminal resistance, $\Omega$ | $Z_{in} = 149.806$ |
| $D_{gp} := \lambda_{ant} \cdot 5$ | minimum ground plane diameter, m | $D_{gp} = 0.061$ $D_{gp} \cdot 39.37 = 2.41$ in. |

Signal Propagation Calculations

| | | |
|---|---|---|
| $\lambda := \frac{c_o}{f_{ant}}$ | $\lambda = 0.122$ | wavelength transmit, meters |
| $d_s := d_f \cdot 0.3048$ | $d_s = 91.44$ | distance separation, meters |
| $S_t := 10 \cdot \log\left(\frac{S_{tt}}{.001}\right)$ | $S_t = 30$ | transmitter circuit output power, dBm |
| $G_t := 10 \cdot \log(G_{tt})$ | $G_t = 16.153$ | transmitter antenna gain dB |
| $P_t := 20 \cdot \log\left(\frac{4 \cdot \pi \cdot d_s}{\lambda}\right)$ | $P_t = 79.448$ | path loss, dB (reciprocal term) |
| $S_{rr} := \frac{S_{tt} \cdot G_{tt}}{\left(4 \cdot \pi \cdot \frac{d_s}{\lambda}\right)^2}$ | $S_{rr} = 4.683 \cdot 10^{-7}$ | signal power at loop, watts |
| $S_r := (S_t + G_t) - P_t$ | $S_r = -33.295$ | impinging signal power, dBm |
| $S_{rr} := 10^{Sr \cdot 0.1 - 3}$ | $S_{rr} = 4.683 \cdot 10^{-7}$ | impinging signal power, watts |
| $E_\phi := \sqrt{S_{rr} \cdot \left(\frac{\mu_o}{\varepsilon_o}\right)^{\frac{1}{2}}}$ | $E_\phi = 0.013287$ | impinging e-field intensity, V/m |
| $\theta := \frac{\pi}{2}$ | $r := 1$ | e-field to loop angle of incidence, radians |

Return Signal

The following equations are used to calculate the field strength and power of the RF signal returned from the loop inductor at the RF transmitter/receiver helical antenna. The results are presented graphically in FIG. 9 which graphs field strength decay in volts per meter as a function of time and in FIG. 10 which graphs field power decay in dbm as a function of time.

$$I_\xi(n) := \frac{q_e(n)}{\sqrt{L \cdot C}} \quad \text{loop current, amperes}$$

$$\omega := 2 \cdot \pi \cdot f \quad \text{radial frequency, rad}/s$$

$$\beta := \frac{2 \cdot \pi}{\lambda} \quad \text{phase constant}$$

Field Strength (Volts/Meter) (See FIG. 9.)

$$E_\xi(n) := -j \cdot \omega \cdot \mu_o \cdot I_\xi(n) \cdot \frac{e^{-j \cdot \beta \cdot a_s}}{4 \cdot \pi \cdot d_s} \cdot a \cdot 2 \cdot$$

$$j \cdot \pi \cdot Jl(\beta \cdot a \cdot \sin(\theta|E_\xi(0)| = 1.44 \cdot 10^{-4} \quad V/m$$

-continued

Field Power (dbm) (See Fig. 10.)

$$S_s(n) := 10 \cdot \log\left[\frac{(|E_\xi(n)|)^2}{\sqrt{\frac{\mu_o}{\varepsilon_o}}} \cdot \frac{1}{10^{-3}}\right]$$

As can be seen from FIG. 10, at the time the illuminating RF transmitter/receiver shuts off, the return signal possesses a strength of over −80 dbm at the RF transponder antenna which decays to approximately −100 dbm within 600 nanoseconds. Design simulations indicate that the receiver circuit disclosed has sufficient sensitivity to detect signals down to approximately −96 dbm. With the given return signal strength and receiver sensitivity our studies indicate that a golf ball embodying the passive transponder array of the present invention can be readily detected at a range in excess of 100 feet by a hand held, battery operated RF transponder incorporating the disclosed receiver/transmitter circuits and helical antenna.

In order to ensure that the golf ball location system of the present invention operates as described particular care must be taken in manufacturing the flat-loop inductors. In order for the location system to be operative the flat-loop inductors must resonate at substantially 2.45 Ghz. Each loop inductor is etched onto insulative substratum using conventional photo-resistive etching techniques on two ounce copper foil. The accuracy of the etching process results in a +/−0.0005 inch tolerance on each inductor edge. Thus, the total tolerance variation of the critical loop gap is +/−0.001 inches. With this tolerance variation the resonant frequency of each loop inductor would vary significantly from one unit to next, thereby requiring that the receiver possess a wide bandpass to sense all of the resulting frequency variations. A wide bandpass degrades a receiver's signal to noise to ratio and makes it less able to detect low level signals. Therefore, in manufacturing the loop inductor a calibration process is included where each loop gap is laser trimmed to achieve a precise frequency. Also, the insulative substratum is cut away in the center of the loop. This allows the loop to more easily conform to the spherical radius of a golf ball and to lie tangent to the ball core surface.

In use, the golf ball location system of the present invention operates as follows: Assume a golfer has just hit a drive using a ball incorporating the passive array 36. Now, further assume that the unfortunate golfer looked upward and was momentarily blinded by the sun and thus lost his or her ball. At this point, the golfer will take the RF transmitter/receiver 10 (FIG. 1) and point the transponder in the general direction where he or she thought the ball went while depressing the momentary contact switch 112 (FIG. 11). Depressing switch 112 turns on the multivibrator 94.

Referring to FIG. 11, in response the multivibrator 94 will begin cyclic operation of the transmitter and receiver circuits. The vibrator starts each cycle by simultaneously activating the transmitter 100 and the RF switch 92, thereby coupling the transmitter circuit to the antenna 20 thus causing a carrier wave pulse to be emitted for a predetermined period of time. Subsequently, the vibrator again activates the RF switch thereby coupling the receiver circuit 204 to the antenna while simultaneously shutting off the transmitter and turning on the receiver. The multivibrator will allow the receiver to "listen" for an incoming signal for a period of time substantially equal to the time required for an outgoing transmitter signal to travel 100 feet, and energize the passive array causing the array to emit a signal, and for the emitted signal to return. If a return signal is detected the receiver will alert the golfer by means of the audio/visual display 234. Subsequently, the cycle repeats for as long as the momentary contact switch is depressed.

From the golfer's point of view, after depressing the momentary contact or "on" switch 112, he or she may look to see if the audio/visual display 234 has located the ball. The golfer may sweep the transmitter/receiver 10 from side to side until he or she detects a reading indicating the location of the ball. If the ball is not visible on the field of play the golfer need only walk in the direction the transmitter/receiver is pointing and sweep the unit slightly from side to side. By observing the audio/visual display which may include a signal strength meter and an audio beeper responsive to the return signal generated by the ball, and advancing in the direction indicated by the display, the golfer will be able to precisely locate the ball.

Figure 12:
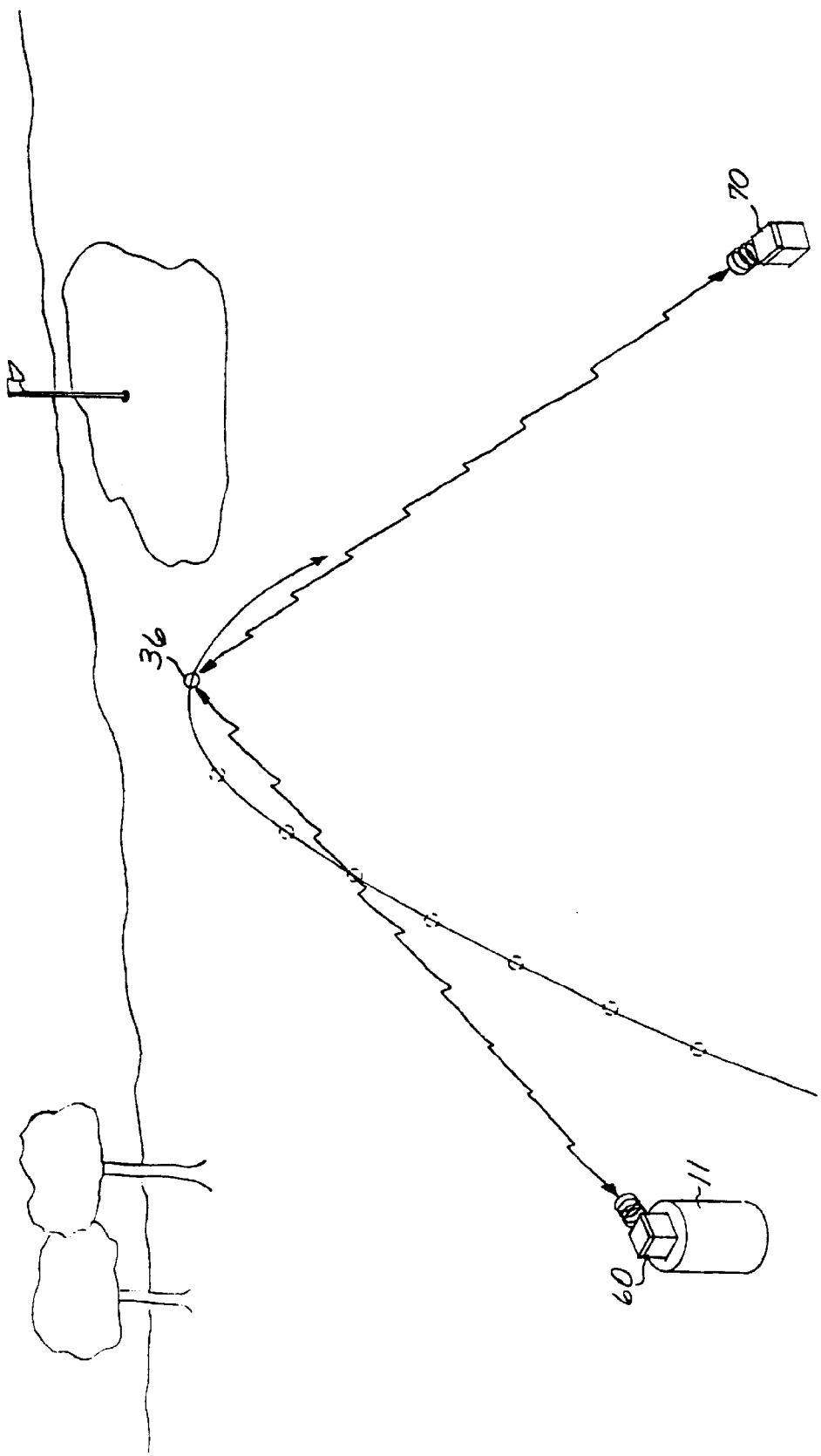
FIG. 12 is a generalized perspective view of a system for tracking the flight path of a golf ball embodying features of the present invention.

Referring to FIG. 12, in a second additional embodiment of the present invention, a pair of RF transmitter/receivers 60 which are similar in design to transmitter/receiver 10, but of greater power handling capacity and correspondingly greater range, may be utilized to track the flight path of a golf ball incorporating the passive array 36. By coupling each RF transmitter/receiver with an electro-mechanical drive mechanism 11 which sweeps the transmitter/receivers across the field of play, the in-flight location of a golf ball can be determined at discrete points in time. The data points from a pair of transmitter/receivers may be employed to reconstruct the 3-dimensional path of a golf ball by means of triangulation. Computer graphing programs well known to those skilled in the relevant art could be utilized to display the results. Those skilled in the relevant art will also appreciate that the electro-mechanical drive mechanism 11 can be replaced by a phased or switched array of antennas which are sequentially pulsed by an electronic controller.

A further variation of the in-flight tracking concept makes use of the omni-directional nature of the signal emitted by the array 36. Since an omni-directional signal has a 360 degree radiation pattern it is not necessary that the same transmitter both send the energizing pulse and detect the return signal. Therefore, the golf ball could be pulsed by a broadcasting RF transmitter/receiver 60 and the return signal detected by a plurality of "listening" receivers 70 (FIG. 12). The golf ball's in flight location could then be determined by triangulation among the "listening" receivers. In the system just described the "listening" receivers would have to be placed such that they don't directly face the broadcasting transmitter/receiver, or the "listening" receivers would have to be synchronized with the broadcasting transmitter/receiver such that the "listening" receivers are turned off when the broadcasting transmitter/receiver is transmitting. Methods for synchronizing an array of transmitter/receivers are well known to those skilled in the art.

It will be appreciated by those skilled in the art that the golf ball locating system of the present invention provides a novel golf ball containing a passive transponder array designed to work in conjunction with an RF transmitter/receiver which includes a circularly polarized helical antenna. It will be further appreciated that the system can be readily adapted for either locating stationary golf balls or for tracking golf balls in flight. The tracking of golf balls in flight and/or detection of ball spin can be mated to golf course video simulation systems to provide in-play review information including flight path data, and distance, and spin overlaid on the golf course layout to realistically reconstruct portions of or entire game play, including courses using global positioning systems. In addition, the system may be readily adapted to other uses such as tracking or locating people or movable objects. For example, a "tag" composed of an array of transponders could be produced for the purpose of locating skiers buried in an avalanche. A ski resort could issue transponder equipped tags with lift tickets, (or skiers could wear clothing incorporating "tags") and thereby greatly increase the odds of locating skiers lost due to injury, avalanche, or blizzard (whiteout) conditions. Users of a location system embodying the present invention could acquire array equipped tags which could be attached to luggage, keyrings, or any other object the user wishes to be able to locate more easily. Also, an isotropic "tag" could be formed into the plastic grip of a gun allowing an officer to determine if a car stopped for a traffic violation contained weapon before approaching the car.

While only the present preferred embodiment and one application of the location system of the present invention has been described in detail, as will be apparent to those skilled in the art, certain changes and modifications can be made without departing from the scope of the invention as described in the following claims.

What is claimed is:

1. A locator apparatus comprising:
   a retrievable object including a passive transponder device formed by a plurality of loop transponders oriented at an angle of 90 degrees to each other;
   said transponder device being configured to resonate at a selected radio frequency and to emit a radio frequency return signal upon being illuminated by a source RF signal at said selected frequency;
   an active RF transmitter/receiver including a circuit for illuminating said passive transponder with an RF signal at said selected frequency to excite said passive transponder and including a circuit for detecting said emitted return signal and further including a helical antenna for transmission of said selected source signal and detection of said return signal; and
   at least one indicator included within said RF transmitter/receiver, responsive to said return signal, to communicate a perceptible signal to a user.

2. The locator apparatus as set forth in claim 1 wherein:
said passive transponder is in the form of a discontinuous loop which includes a capacitance gap and is constructed of a lamination of an insulative material and a metal foil conductor.

3. The locator apparatus as set forth in claim 2 wherein:
said metal foil conductor is copper.

4. The locator apparatus as set forth in claim 1 wherein:
a portable housing houses said transmitter, receiver, antenna and indicator.

5. The locator apparatus as set forth in claim 2 wherein:
said capacitance gap is laser trimmed to achieve a preselected resonance frequency.

6. The locator apparatus as set forth in claim 1 wherein:
said passive transponder is configured to resonate at substantially 2.45 ghz for substantially 800 nanoseconds after said illuminating source RF signal is turned off.

7. The locator apparatus of claim 1 wherein:
said retrievable object is a golf ball.

8. The locator apparatus set forth in claim 1 wherein:
said indicator is responsive to said return signal to communicate an audio signal to a user.

9. The locator apparatus set forth in claim 1 wherein:
said indicator is responsive to said return signal to communicate a visual signal to a user.

10. The locator apparatus set forth in claim 1 wherein:
said RF transmitter/receiver is hand held.

11. The locator apparatus set forth in claim 1 wherein:
said RF transmitter/receiver is battery operated.

* * * * *